United States Patent
Walls

(10) Patent No.: US 11,355,028 B2
(45) Date of Patent: Jun. 7, 2022

(54) SYSTEMS AND METHODS FOR AIDING MUSIC THEORY COMPREHENSION

(71) Applicant: Acoustic Walls, LLC, Virginia, MN (US)

(72) Inventor: Joseph Bernard Walls, Virginia, MN (US)

(73) Assignee: Acoustic Walls, LLC, Virginia, MN (US)

( * ) Notice: Subject to any disclaimer, the term of this patent is extended or adjusted under 35 U.S.C. 154(b) by 0 days.

(21) Appl. No.: 16/785,559

(22) Filed: Feb. 8, 2020

(65) Prior Publication Data

US 2021/0248918 A1  Aug. 12, 2021

(51) Int. Cl.
*G09B 15/00* (2006.01)
*G09B 15/02* (2006.01)

(52) U.S. Cl.
CPC ......... *G09B 15/026* (2013.01); *G09B 15/005* (2013.01); *G09B 15/023* (2013.01)

(58) Field of Classification Search
CPC .. G09B 15/026; G09B 15/005; G09B 15/023; G09B 15/006; G09B 15/007; G09B 15/00
See application file for complete search history.

(56) References Cited

U.S. PATENT DOCUMENTS

| | | | |
|---|---|---|---|
| 1,391,986 A | 9/1921 | Smith | |
| 1,566,860 A | 12/1925 | Hainzigianis | |
| 1,587,169 A | 6/1926 | Mauck | |
| 1,945,398 A | 1/1934 | Gregg | |
| 1,947,686 A | 2/1934 | Walsh | |
| D179,852 S | 3/1957 | James | |
| 2,788,699 A * | 4/1957 | Pipkin | G09B 15/00 84/470 R |
| 2,832,252 A | 4/1958 | Gabriel | |
| 3,250,102 A | 5/1966 | Howeler | |
| 3,558,871 A | 1/1971 | Rogers | |
| 3,592,099 A | 7/1971 | Gibby | |
| D249,311 S | 9/1978 | Coulthurst | |
| D292,932 S | 11/1987 | McGinley | |
| D335,595 S | 5/1993 | Bowen | |
| D342,547 S | 12/1993 | Putman et al. | |

(Continued)

OTHER PUBLICATIONS

Mode-Joe Instructional Video, published by Acoustic Walls on Jul. 29, 2019 [online], [site visited Jul. 20, 2020] Available from Internet, URL:<https://www.youtube.com/watch?v=akbMwfRK_Wc&feature=emb_title>(Year: 2019), 1 page.

(Continued)

*Primary Examiner* — Kimberly R Lockett
(74) *Attorney, Agent, or Firm* — Fredrikson & Byron, P.A.

(57) ABSTRACT

The invention provides a device for music theory comprehension. The device includes a base portion and a first stencil. The base portion includes a plurality of marks. Each mark includes indicia representing a musical note. The first stencil includes a first interior shape, wherein the first stencil and the base portion are selectively positionable relative to each other. At each of a plurality of predetermined positions determined by the plurality of marks, the first interior shape of the first stencil surrounds multiple marks. The multiple marks include indicia representing seven musical notes representing a unique chord family.

20 Claims, 12 Drawing Sheets

(56) References Cited

U.S. PATENT DOCUMENTS

| | | |
|---|---|---|
| D348,576 S | 7/1994 | Narramore |
| 5,386,757 A * | 2/1995 | Derrick ............... G09B 15/008 |
| | | 84/471 SR |
| 5,429,029 A | 7/1995 | Mendiola |
| D401,273 S | 11/1998 | Mayers |
| D427,637 S | 7/2000 | Wood |
| D457,004 S | 5/2002 | Brown |
| D542,962 S | 5/2007 | Mellon |
| 7,332,665 B2 | 2/2008 | Haney |
| D622,318 S | 8/2010 | Tsai et al. |
| D699,299 S | 2/2014 | Bruker |
| D843,038 S | 3/2019 | Vyvey |
| D904,514 S | 12/2020 | Walls |
| 2003/0167989 A1 | 9/2003 | Lee et al. |
| 2005/0279265 A1 | 12/2005 | Chien |
| 2015/0009660 A1 | 1/2015 | Lee |
| 2015/0379885 A1 | 12/2015 | Paulovich |
| 2020/0158488 A1 | 5/2020 | Hsiao et al. |

OTHER PUBLICATIONS

Fleser, J., "The Chord Wheel: The Ultimate Tool for All Musicians," Oct. 19, 2012, retrieved on Sep. 19, 2019 from http://johnfmorganmusic.com/img/Chord-Wheel.pdf, 18 pgs.

"The Circle of Fifths Explained," Music Theory, Jun. 30, 2019, retrieved on Oct. 15, 2019 from https://ledgernote.com/columns/music-theory/circle-of-fifths-explained/, 13 pgs.

"The Circle of Fifths Explained," Ledger Note, Music Theory, Sep. 21, 2016, retrieved on Oct. 15, 2019 from https://web.archive.org/web/20161018160727/https://ledgernote.com/columns/music-theory/circle-of-fifths-explained/, 7 pgs.

* cited by examiner

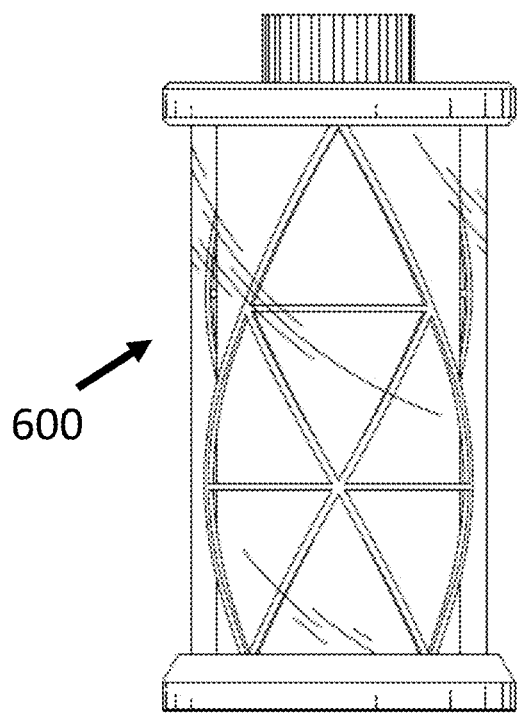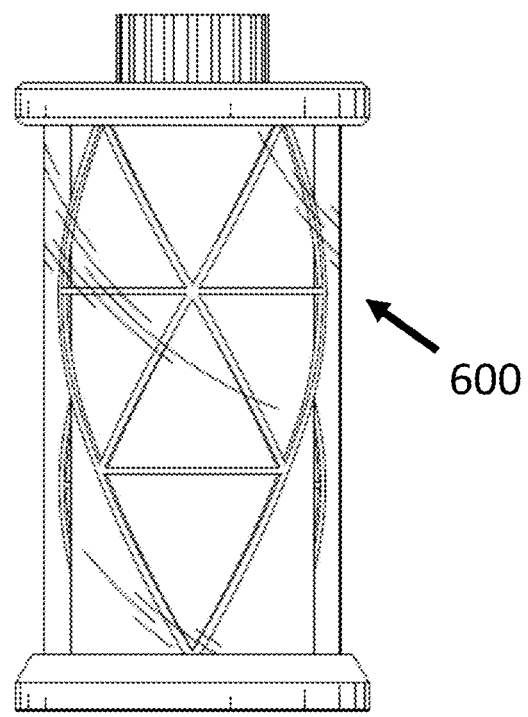
FIG. 6B  FIG. 6C
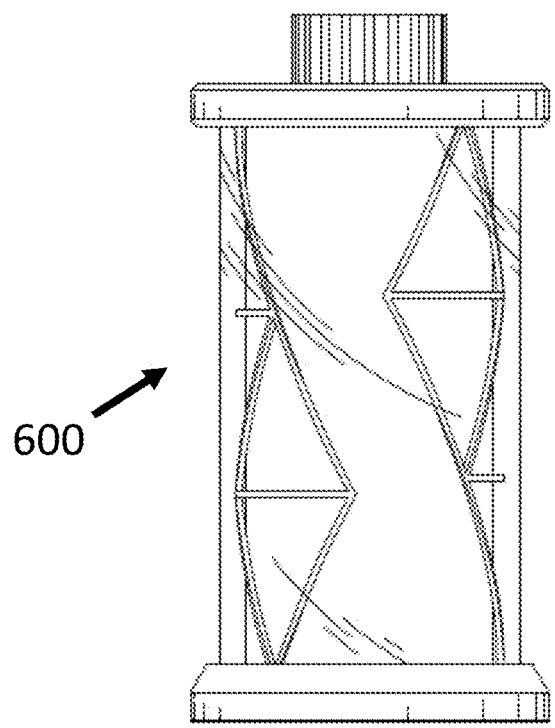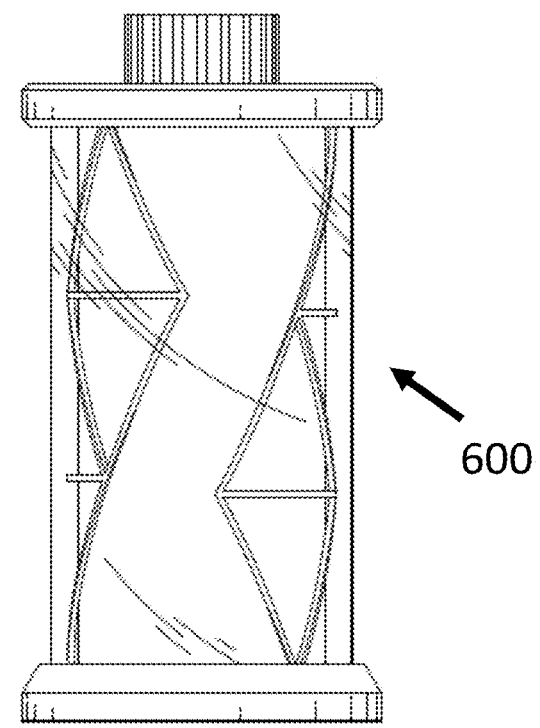
FIG. 6D  FIG. 6E

SYSTEMS AND METHODS FOR AIDING MUSIC THEORY COMPREHENSION

FIELD OF INVENTION

The present invention generally relates to music theory comprehension devices and methods of use.

BACKGROUND OF THE INVENTION

Various musical slide rules and other devices for teaching different aspects of music theory are known. However, many such devices were designed in a complex manner, making them difficult to understand and offering little guidance to a user with limited knowledge of music theory. For example, conventional devices often include repetitive information (e.g., by including each note more than once on the device so as to indicate each scale the note is included in). However, such systems fail to concisely and compactly display information to help teach a user the relationships between various notes in a scale. Accordingly, there is a need for a compact device that can aid a user in understanding music theory.

SUMMARY OF THE INVENTION

Certain aspects of this disclosure provide a device for music theory comprehension. The device includes a base portion and a first stencil. The base portion includes a plurality of marks. Each mark includes indicia representing a musical note. The first stencil includes a first interior shape, wherein the first stencil and the base portion are selectively positionable relative to each other. At each of a plurality of predetermined positions determined by the plurality of marks, the first interior shape of the first stencil surrounds multiple marks. The multiple marks include indicia representing seven musical notes representing a unique chord family.

Certain other aspects of this disclosure provide a method of manufacturing a music theory comprehension device. The method includes providing a base portion and marking the base portion with a plurality of marks. Each mark includes indicia representing a musical note. The plurality of marks includes a center row of marks with indicia representing the roots of each major scale. All adjacent marks in the center row have indicia representing musical notes that are spaced by a perfect fifth. Each mark in the center row additionally is adjacent to another mark with indicia representing its relative minor. Each mark having indicia that represents the diminishing note is opposite the mark with indicia representing the relative minor. The method can also include providing a first stencil having a first interior shape such that at a plurality of predetermined positions determined by the plurality of marks, the first interior shape of the first stencil surrounds multiple marks that represent a first musical scale.

BRIEF DESCRIPTION OF DRAWINGS

Advantages of the present invention may become apparent to those skilled in the art with the benefit of the following detailed description and upon reference to the accompanying drawings.

FIGS. 6A-6E show an exemplary music theory comprehension device, with the marks removed from the base portion for clarity.

DETAILED DESCRIPTION OF THE INVENTION

The following detailed description is exemplary in nature and is not intended to limit the scope, applicability, or configuration of the invention in any way. Rather, the following description provides some practical illustrations for implementing various embodiments of the present invention. Unless otherwise noted, illustrations of various aspects of the disclosure are not necessarily drawn to scale. Examples of constructions, materials, dimensions, and manufacturing processes are provided for selected elements, and all other elements employ that which is known to those of ordinary skill in the field of the invention. Those skilled in the art will recognize that many of the noted examples have a variety of suitable alternatives.

Figure 1:
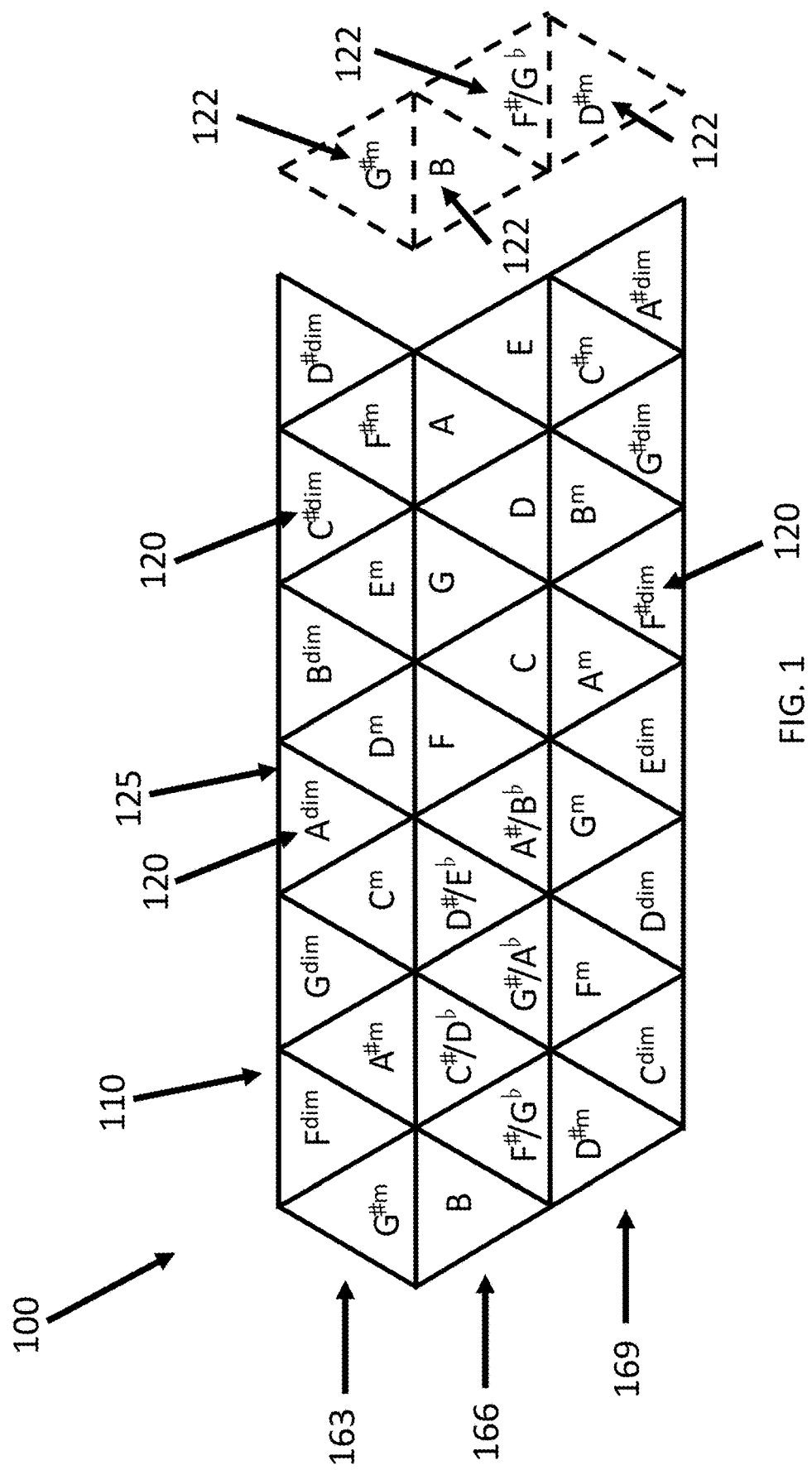
FIG. 1 shows an exemplary base portion of a music theory comprehension device.

FIG. 1 illustrates an exemplary music theory comprehension device 100. The music theory comprehension device 100 includes a base portion 110. The base portion 110 may be made of any material known to one of ordinary skill in the art, such as laminated paper, plastic, wood, glass, resin, composite, and/or various types of fabric. Alternatively, the base portion 100 may be displayed electronically, such as on a screen, via a projector, or the like.

With continued reference to FIG. 1, the base portion 110 comprises a plurality of marks 120. In some embodiments, each mark 120 comprises indicia representing a musical note. Additionally or alternatively, each mark 120 can comprise indicia representing a chord, such as a guitar chord or a chord for another musical instrument. In some cases, the plurality of marks 120 may be integrated into the base portion 110 (e.g., printed directly onto base portion 110). In other cases, the plurality of marks 120 may be separable from and/or movable relative to base portion 110. In such instances, the marks 120 can comprise a material selected from laminated paper, wood, fabric, or any other suitable material known to one of skill in the art.

As shown in FIG. 1, each of the plurality of marks 120 may be surrounded (e.g., on all sides) by a respective border, such as border 125. In the embodiment of FIG. 1, each mark 120 has a triangular border around it. Thus, each triangle is considered an individual unit of the base portion 110. Although not shown, borders 125 can comprise alternative shapes, such as a square, another regular polygon, or some other shape. In certain embodiments, at least some of the borders 125 can be omitted. In some cases, the borders 125 of adjacent individual units of the base portion 110 can be spaced from each other or can define shapes that are configured to be in contact with each other (e.g., shapes that tesselate or otherwise fit together).

Figure 6A:
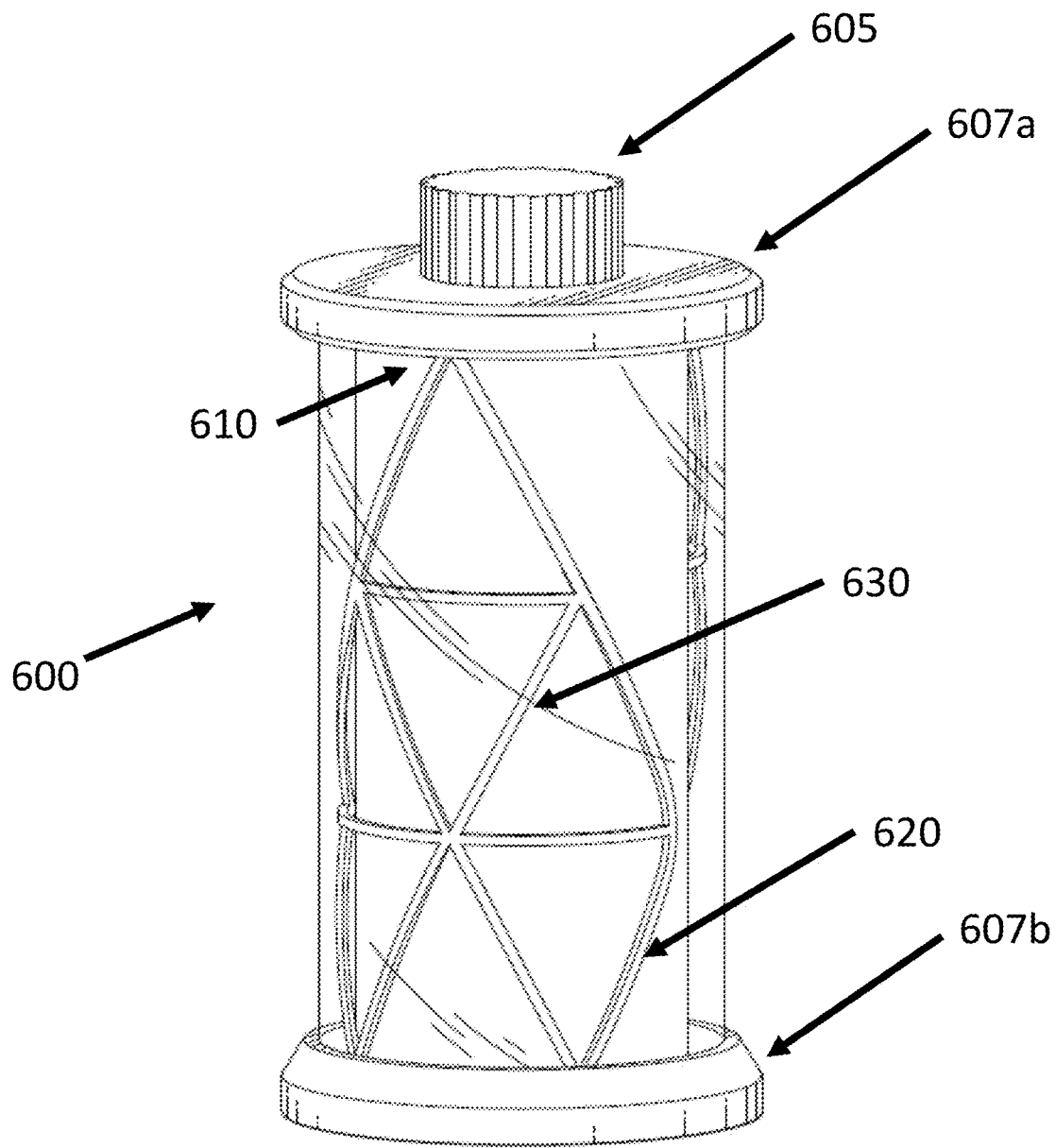

In some embodiments, the plurality of marks 120 may be organized so as to provide a condensed and efficient way for a user to visually reference and/or learn music theory. FIG. 1 shows an embodiment where the music theory comprehension device 100 comprises thirty-six total marks, with each mark 120 representing one of thirty-six musical notes and/or chords (e.g. twelve major chords, twelve minor chords, and twelve diminished chords). In some embodiments, the marks 120 can include additional marks 122 (e.g. the four additional marks shown with perforated outlines in FIG. 1). For example, when base portion 110 is provided as part of a two-dimensional (i.e., linear/planar) music theory comprehension device, the four additional marks 122 are added to the base portion 110 to allow the stencil 400 to be movable and usable in both directions (e.g. FIGS. 1 and 2). In other embodiments, the additional marks 122 can be omitted from base portion 110, such as when base portion 110 is provided as part of a three-dimensional music theory comprehension device (e.g. FIGS. 6A-B). Where provided, the additional marks 122 and/or the shapes/units surrounding such additional marks 122 can be provided with a color that is different from the color of the other marks 120 (or the color of the shapes/units surrounding the other marks 120). In embodiments of this nature, all marks 120 are provided on the base portion 110 only once, and thus all marks 120 are unique and non-redundant. Additionally or alternatively, each row (e.g. top row 163, middle row 166, and bottom row 169) may comprise marks with indicia having at most one repetitive note (e.g. additional marks 122) or having no repetitive notes.

By providing only thirty-six or forty total marks 120, the present music theory comprehension device 100 provides a simplified way of learning music theory. This is in contrast to conventional devices, which can have up to forty-eight marks (or geometric regions or shapes that includes notes or chords). Such known devices inherently include redundancies that can be confusing when trying to draw a concise relationship between chords and chord families.

The middle row of marks, shown in FIG. 1 as middle row 166, can comprise indicia representing the major chords, with each adjacently positioned major chord optionally spaced by a perfect fifth. As shown in FIG. 1, the leftmost mark in middle row 166 comprises indicia representing the musical note "B"; then moving adjacently to the right, the marks comprise indicia representing the musical notes "F♯/G♭", "C♯/D♭", "G♯/A♭", "D♯/E♭", "A♯/B♭", "F", "C", "G", "D", "A" and "E". In some embodiments (e.g., where base portion 110 is part of a two-dimensional device 100), additional marks 122 may be used to repeat some of the marks 120. With respect to FIG. 1, the middle row 166 of base portion 110 may comprise the additional marks 122 of "B" and "F♯/G♭."

As shown in FIG. 1, the marks 120 can comprise a top row 163 and bottom row 169 of marks representing both the minor chords and diminished chords for the respective major chords. As shown in FIG. 1, the diminished and minor chords may alternate with each other. As shown in FIG. 1, the top row 163 of base portion 110 comprises marks 120 representing the musical notes "G♯", "F", "A♯", "G", "C", "A", "D", "B", "E", "C♯", "F♯" and "D♯". In some embodiments, additional marks 122 may be used to repeat some or all of the plurality of marks 120 of the top row 163, such as "G♯". Additionally, as shown in the embodiment of FIG. 1, the bottom row 169 of base portion 110 has a plurality of marks 120 representing the musical notes "D♯", "C", "F", "D", "G", "E", "A", "F♯", "B", "G♯", "C♯" and "A♯". In some embodiments, additional marks 122 may be used to repeat some of the marks 120 of the bottom row 169, such as "D♯".

With respect to FIG. 1, each mark 120 representing a major chord shown in the middle row 166 of base portion 110 may be positioned to directly oppose a mark 120 representing a minor chord (e.g., the relative minor chord) present in either the top row 163 or bottom row 169 of the base portion 110. In particular, an individual unit in one row of the base portion 110 can be positioned base portion-to-base portion with an individual unit in an adjacently positioned row of the base portion 110 (e.g., such that the base portions of the two individual units are joined together). For example, as illustrated in FIG. 1, "B" in middle row 166 of base portion 110 is positioned base portion-to-base portion with its relative minor "G♯" in top row 163; "F♯/G♭" is positioned base portion-to-base portion with its relative minor "D♯" in bottom row 169; "C♯/D♭" is positioned base portion-to-base portion with its relative minor "A♯" in top row 163; "G♯/A" is positioned base portion-to-base portion with its relative minor "F" in bottom row 169; "D♯/E♭" is positioned base portion-to-base portion with its relative minor "C" in top row 163; "A♯/B♭" is positioned base portion-to-base portion with its relative minor "G" in bottom row 169; "F" is positioned base portion-to-base portion with its relative minor "D" in top row 169; "C" is positioned base portion-to-base portion with its relative minor "A" in bottom row 169; "G" is positioned base portion-to-base portion with its relative minor "E" in top row 163; "D" is positioned base portion-to-base portion with its relative minor "B" in bottom row 169; "A" is positioned base portion-to-base portion with its relative minor "F♯" in top row 163; and "E" is positioned base portion-to-base portion with its relative minor "C♯" in bottom row 169.

With further reference to FIG. 1, each mark 120 representing a major chord shown in middle row 166 can also be positioned to directly oppose a mark 120 representing the diminished chord for the respective major chord. In particular, an individual unit in one row of the base portion 110 can positioned tip-to-tip with an individual unit in an adjacently positioned row of the base portion 110 (e.g., such that the vertices of two individual units in adjacent rows are joined together). For example, as illustrated in FIG. 1, "F♯/G♭" is positioned tip-to-tip with its relative minor "F" in top row 163; "C♯/D♭" is positioned tip-to-tip with its relative minor "C" in bottom row 169; "G♯/A♭" is positioned tip-to-tip with its relative minor "G" in top row 163; "D♯/E♭" is positioned tip-to-tip with its relative minor "D" in bottom row 169; "A♯/B♭" is positioned tip-to-tip with its relative minor "A" in top row 163: "F" is positioned lip-to-tip with its relative minor "E" in bottom row 169; "C" is positioned tip-to-tip with its relative minor "B" in top row 163; "G" is positioned tip-to-tip with its relative minor "F♯" in bottom row 169; "D" is positioned tip-to-tip with its relative minor "C♯" in top row 163; "A" is positioned tip-to-tip with its relative minor "G♯" in bottom row 169; and "E" is positioned tip-to-tip with its relative minor "D♯" in top row 163, As discussed herein, FIG. 1 provides a specific, though non-limiting layout For the plurality of marks 120 (including, in some embodiments, additional marks 122). However, various other layouts are also contemplated and within the scope of the present disclosure. Alternative layouts may provide the plurality of marks 120 in a different arrangement and/or with a different border. For example, in embodiments wherein the borders 125 of the marks 120 are circular, the individual units would not be positioned "base portion-to-base portion" or "tip-to-tip" to one another. In still other embodiments, the borders surrounding the marks may be spaced from each other and/or comprise borders of a plurality of shapes.

Figure 2:
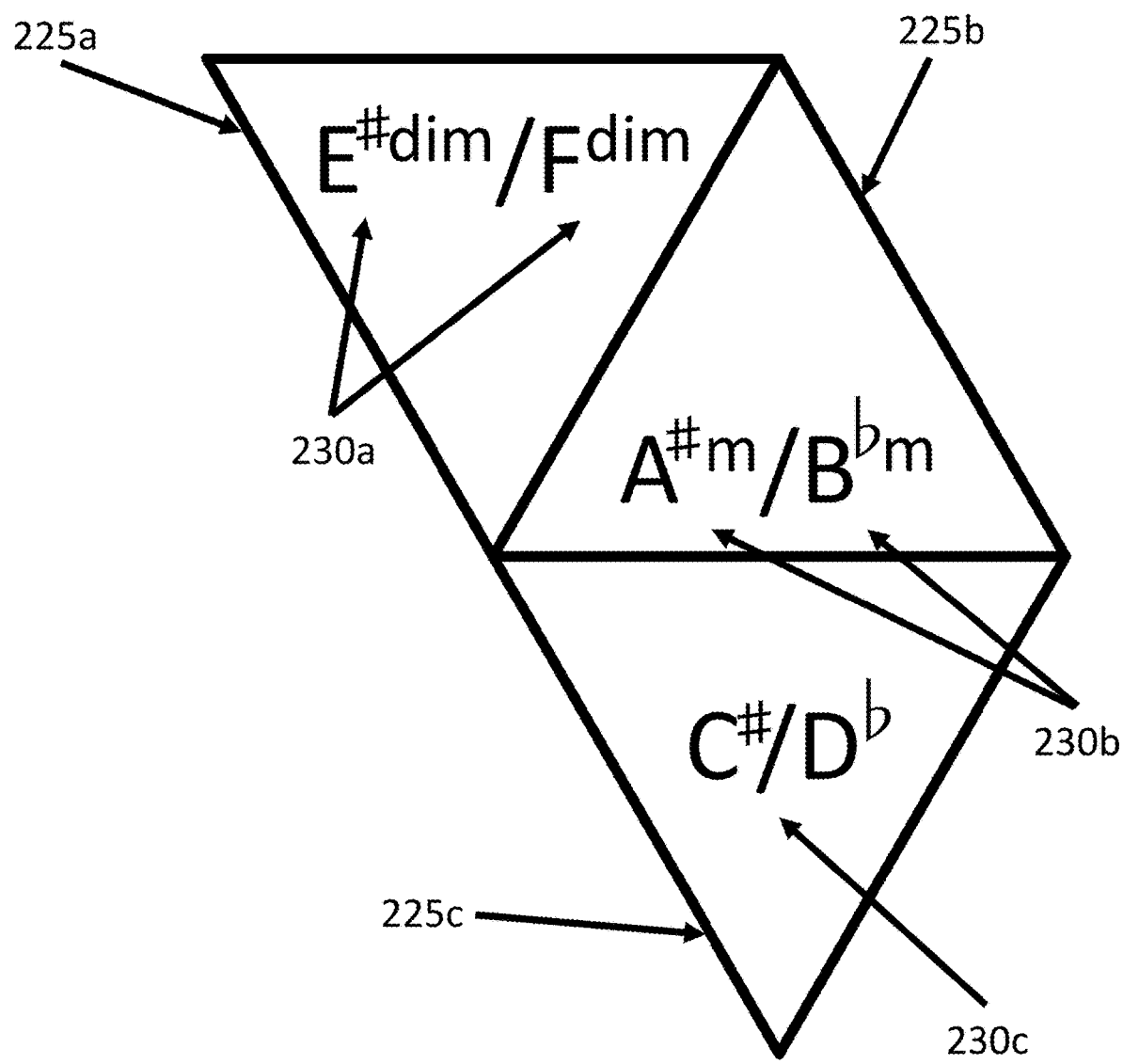
FIG. 2 shows a few exemplary marks on the base portion of FIG. 1.

FIG. 2 shows various of the marks 120 in greater detail illustrated as marks 230a, 230b, and 230c which are outlined by borders 225a, 225b, and 225c, respectively. As shown, each mark (e.g. marks 230a-c) may comprise indicia representing a musical note and indicia representing whether or not the note is pan of a major, minor, or diminishing chord. With respect to FIGS. 1 and 2, indicia representing diminished chords (e.g. "dim") and indicia representing minor chords ("m") are shown. However, other chords or musical properties may additionally or alternatively be represented, such as major chords.

Figure 3:
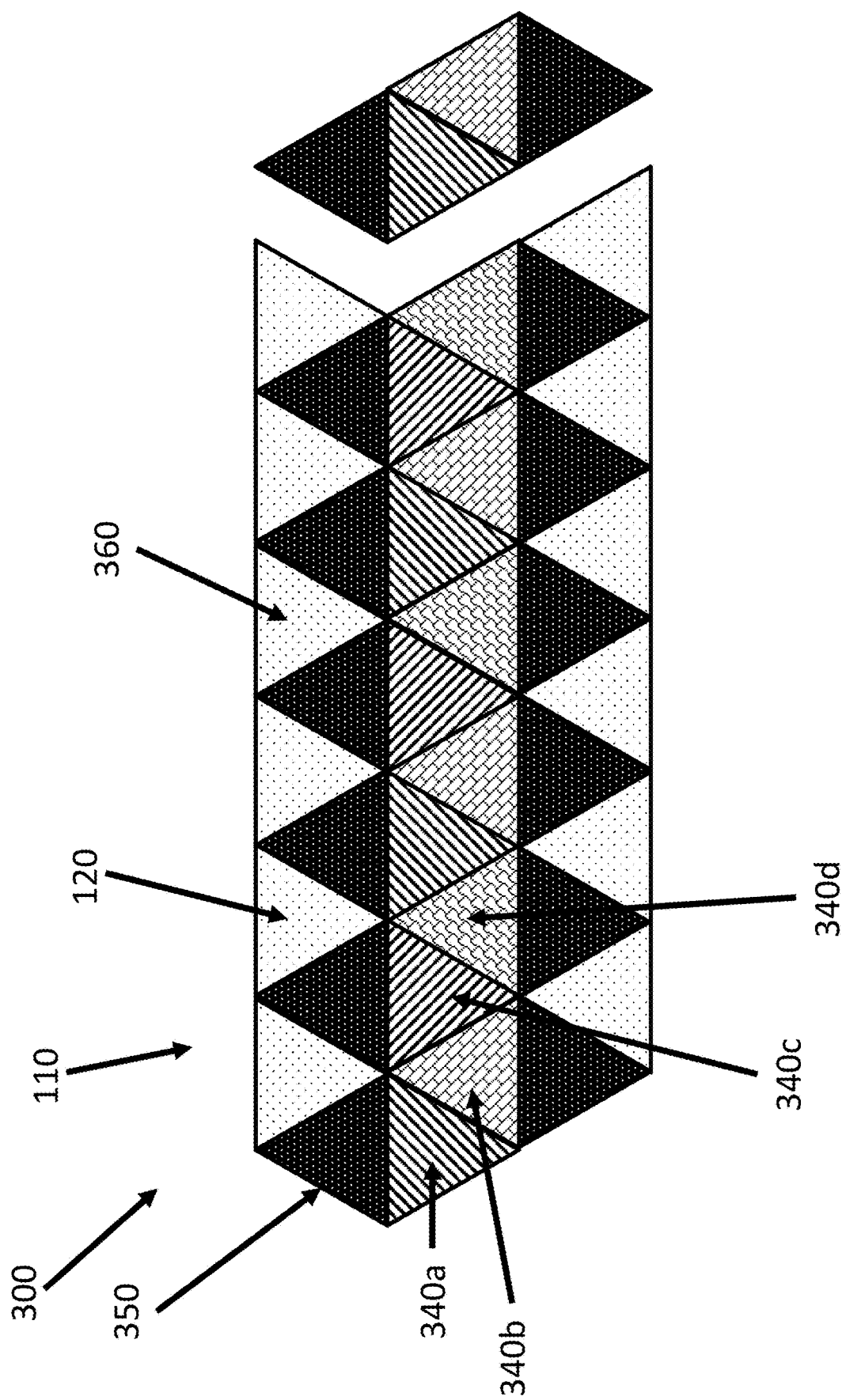
FIG. 3 shows an exemplary base portion of a music theory comprehension device.

In some embodiments, information and/or musical properties may be represented on base portion 110 using colors, patterns and/or hues in addition to or instead of the indicia described above. FIG. 3 shows an example wherein multiple patterns are provided on base portion 100 to allow a user to distinguish between those plurality of marks representing major chords and/or notes, minor chords and/or notes, and diminished chords and/or notes. With respect to FIG. 3, diminished chords are represented with a white triangle comprising black dots (e.g. pattern 360) and minor chords are represented with a black triangle comprising white dots (e.g. pattern 350). Any desired color, pattern, and/or hue may be used on the base portion 110 to represent individual units of base portion 110 having the same musical property. With respect to FIG. 3, major chords are shown with four different patterns (i.e., patterns 340a-340d). Although not shown, other patterns, colors, and hues may be used to represent information and/or musical properties. For example, diminished chords may be shown using a specific hue, such as various yellow hues; minor chords may be represented using a single color, such as blue; and major chords may be shown using multiple colors, such as orange, cyan, green, and red. In some embodiments, various textures and/or materials may be used to distinguish between the plurality of marks 120. Any combination of colors, patterns, hues, textures, materials and/or other indicia known to one of ordinary skill in the art can be used with the present music theory comprehension device 100.

Figure 4A:
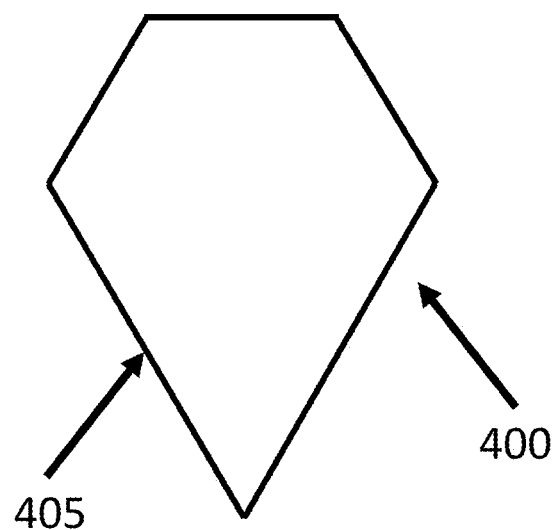
FIGS. 4A-4E show exemplary stencils.

The music theory comprehension device 100 also comprises a stencil 400. As shown in FIG. 4A, the stencil 400 is generally used together with the base portion 110 on music theory comprehension device 100. The stencil 400 can be of the type shown in FIGS. 4A or 4B. The stencil 400 may comprise an interior shape 405 which can be sized to surround seven marks of the base portion 110. In some embodiments, the interior shape 405 may surround only seven marks. Additionally or alternatively, in some embodiments, every mark within the interior shape 405 is at least partially viewable/distinguishable such that no marks within the interior shape 405 are hidden from view. In preferred embodiments, stencil 400 may slide and/or rotate across base portion 110 to a plurality of unique positions, wherein the interior shape 405 of stencil 400 surrounds seven marks of base portion 110 when the stencil 400 is in each position. In particular, the plurality of unique positions may comprise twelve unique positions, wherein each of the twelve unique positions surrounds seven marks representing seven notes in a musical scale and/or chord family.

Figure 4B:
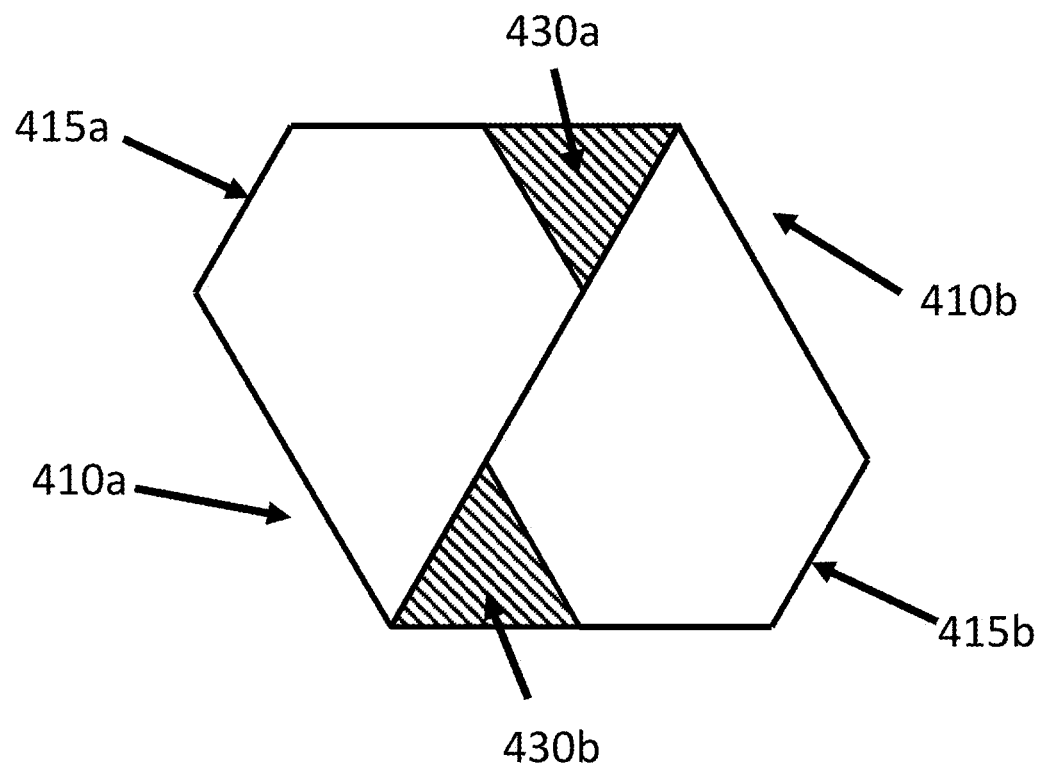

In some embodiments, the stencil 400 can be separate from base portion 110 to allow a user to easily move stencil 400 relative to base portion 110 or vice versa. Alternatively, stencil 400 may be attached to base portion 110. For example, stencil 400 may be attached to base portion 110 in such a manner that stencil 400 is configured to slide across base portion 110. In some embodiments, the stencil 400 may transitionally slide across base portion 110 on a single axis. In order to enable the interior shape 405 of stencil 400 to surround each of the twelve major scales in the twelve unique positions, a combination of first stencil 410a and second stencil 410b may be used. In some embodiments, first stencil 410a and second stencil 410b may be fixedly attached together. Alternatively, first stencil 410a and second stencil 410b may be separable from each other. As shown in FIG 4B, first stencil 410a may comprise a first interior shape 415a and second stencil 410b may comprise a second interior shape 415b. Similar to interior shape 405, first interior shape 415a and the second interior shape 415b may be sized to surround seven marks of the base portion 110. In some embodiments, the first interior shape 415a and the second interior shape 415b may surround only seven marks. Additionally or alternatively, in some embodiments, every mark within each of the first interior shape 415a and the second interior shape 415b is at least partially viewable/distinguishable such that no marks within each of the first interior shape 415a and second interior shape 415b are hidden from view. When using the combination of first stencil 410a and second stencil 410b in connection with (e.g., on) base portion 110, such stencils may include blocker regions 430a and 430b to shield (i.e., block, hide from view) one or more of marks 120 on base portion 110.

Figure 4C:
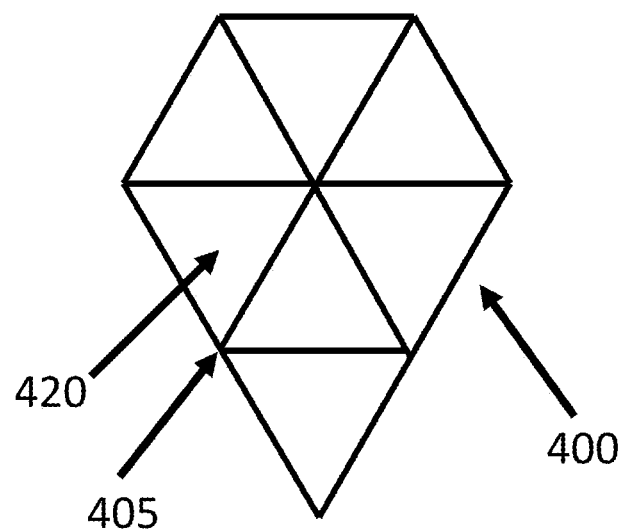
Figure 4D:
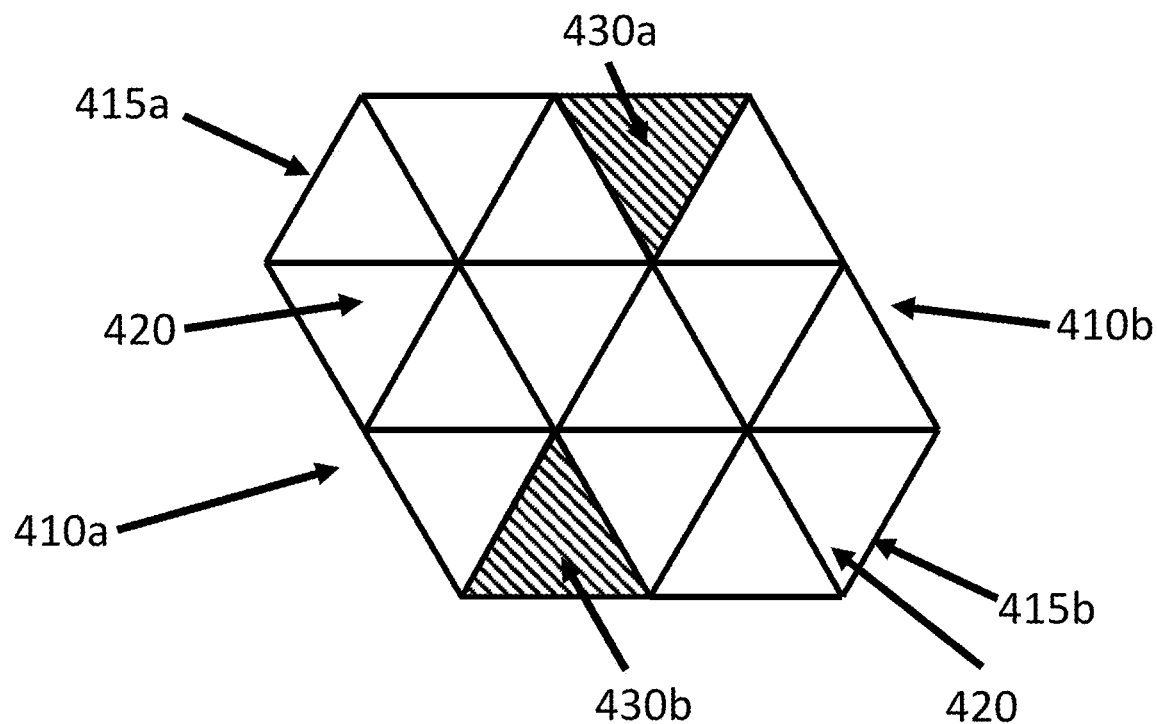

FIGS. 4C and 4D show the stencils of FIGS. 4A and 4B, respectively, wherein the interior shapes of stencils in FIGS. 4C and 4D further include a plurality of sub-stencils 420. More specifically, FIG. 4C illustrates an embodiment wherein interior shape 405 of stencil 400 includes seven sub-stencils 420, and FIG. 4D illustrates an embodiment wherein the first interior shape 415a of first stencil 410a and the second interior shape 415b of second stencil 410b each include seven sub-stencils 420. Each sub-stencil 420 may surround a singular mark (e.g. mark 120) on base portion 110. In some embodiments, sub-stencils 420 may help a user distinguish between different marks on the base portion 110 without hiding any marks within the interior shapes from view.

Any of the stencils described herein may be made of a structural material (e.g. wood, metal wire, string) or printed onto a surface (e.g. paper, laminate, plastic, or the like). In some embodiments, the stencil (e.g. stencil 400, first stencil 410a, second stencil 410b, or the like) may comprise a transparent material or semi-transparent material or may have openings such that marks 120 can be viewed therethrough. In certain other embodiments, the music theory comprehension device 100 (including the stencil) may be represented electronically, such as on an electronic screen or projected via a projector onto a surface.

Figure 5A:
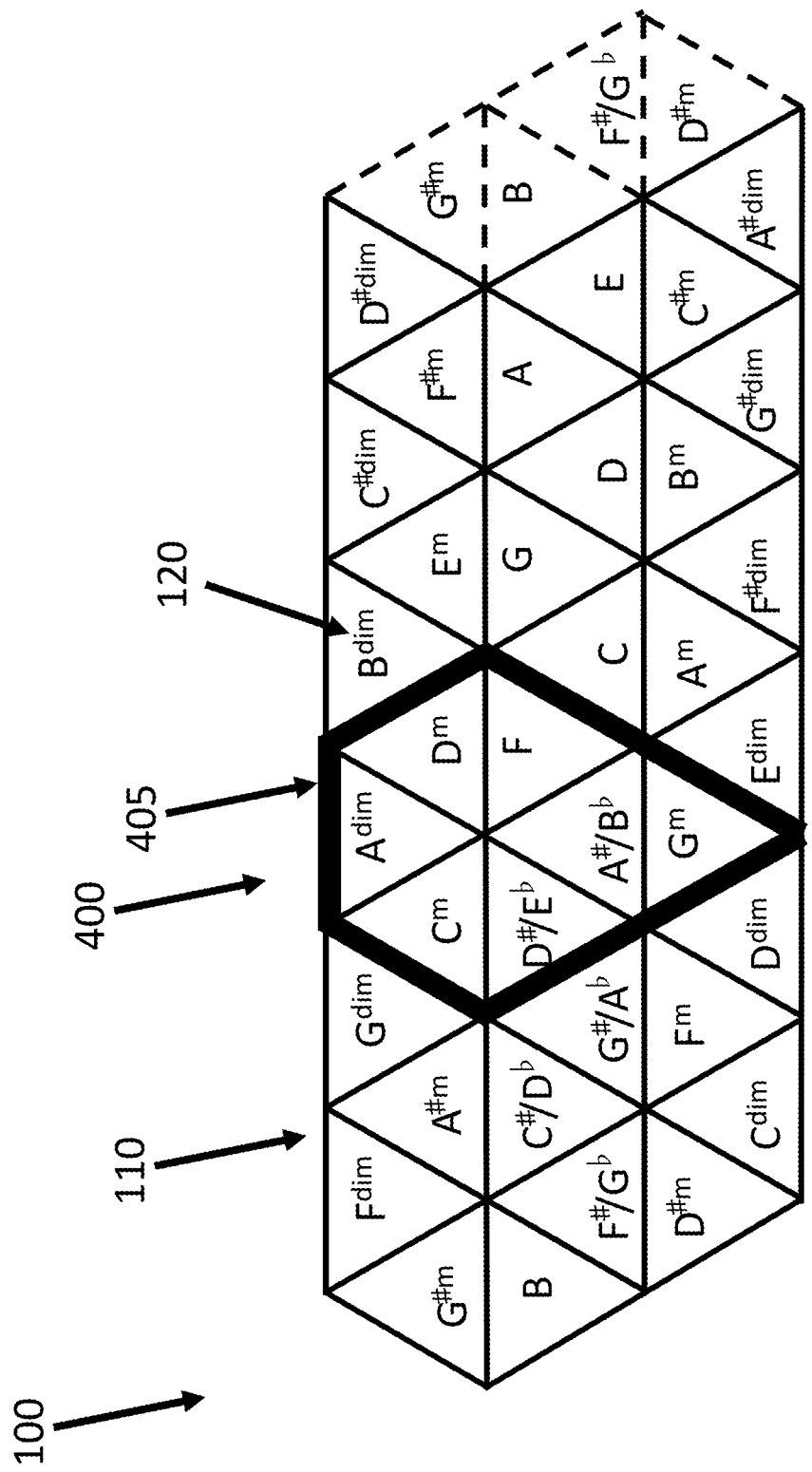
FIG. 5A shows the stencil of FIG. 4A overlaid on the base portion of FIG. 1.

FIG. 5A shows an example of stencil 400 positioned in a unique position on base portion 110. As shown, interior shape 405 of stencil 400 surrounds seven marks on base portion 110. More specifically, stencil 400 surrounds a plurality of marks representing the musical notes of "A♯/B♭", "C", "D", "D♯/E♭", "F", "A", and "G". These seven musical notes are the seven musical notes in the major scale of "A♯" or "B♭". Stencil 400 may be positioned in eleven other unique positions on base portion 110 to surround a different combination of seven marks with interior shape 405 which represent the major scales of "B", "F♯/G♭", "C♯/D♭", "G♯/A♭", "D♯/E♭", "F", "C", "G", "D", "A", and "E". Thus, when the stencil 400 is in each of the twelve unique positions relative to base portion 110, the stencil 400 may surround each of the respective twelve major scales with interior shape 405. In some embodiments, a user may position stencil 400 in one of the plurality of unique positions to surround seven marks with interior shape 405 which represent the seven musical notes in a unique major scale.

Figure 5B:
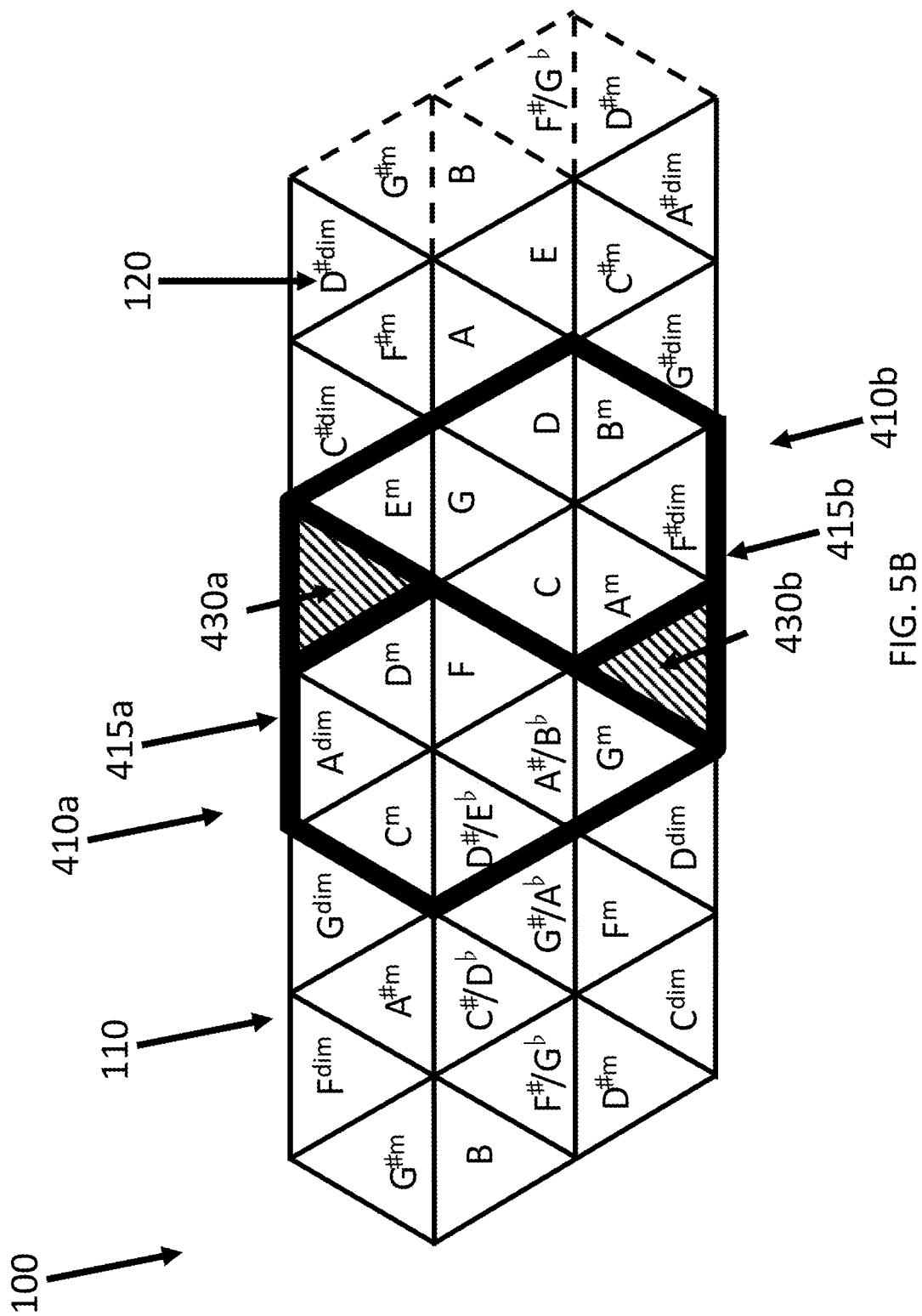
FIG. 5B show the stencil of FIG. 4B overlaid on the base portion of FIG. 1.

Similarly, FIG. 5B shows an example of combination first stencil 410a and second stencil 410b placed in a unique position on base portion 110. As shown, first interior shape 415a of first stencil 410a and second interior shape 415b of second stencil 410b each surround seven marks on base portion 110. Second interior shape 415b of second stencil 410b surrounds marks that are different from the seven marks that the first interior shape 415a of first stencil 410a surrounds. More specifically, the first interior shape of first stencil 410a surrounds a plurality of marks representing the musical notes of "A#/B♭", "C", "D", "D#/E♭", "F", "A", and "G" and the second interior shape of second stencil 410b surrounds a plurality of marks representing the musical notes of "G", "A", "B", "C", "D", "E", and "F#". Consequently, the seven musical notes surrounded by first interior shape 415a are the seven musical notes in the major scale of "A#" or "B♭" and the seven musical notes surrounded by second interior shape 415b are the seven musical notes In the major scale of "G".

Figure 4E:
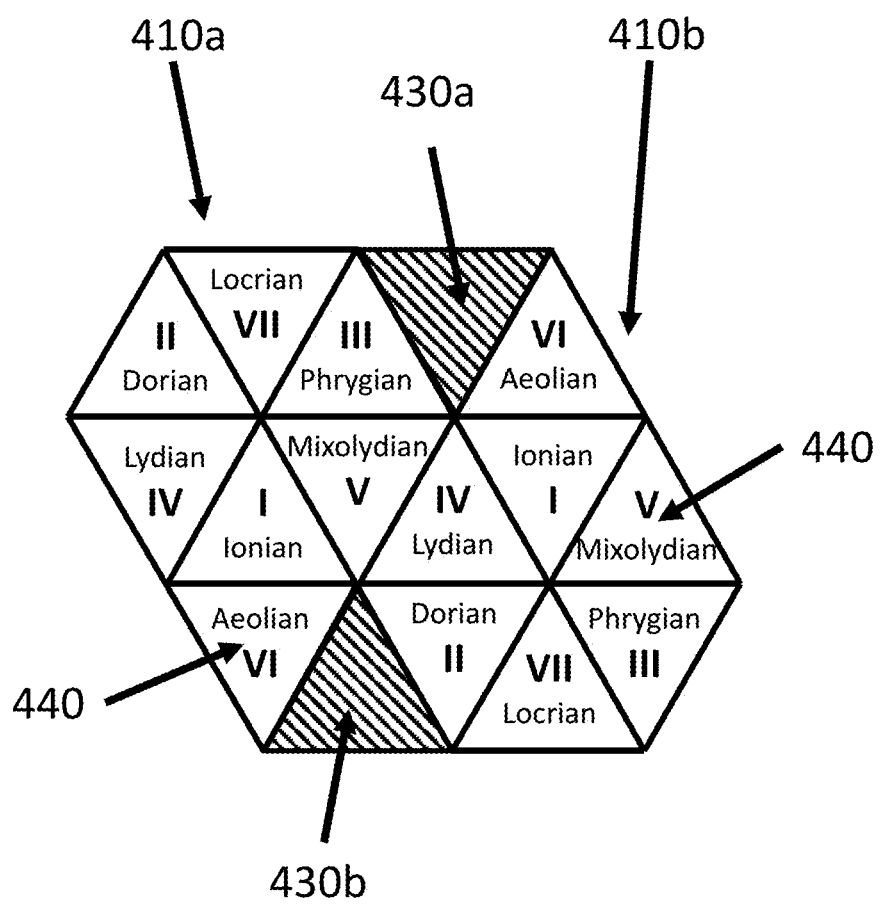

One unique property of the layout of marks 120 on base portion 110 is that in each of the unique positions representing a musical scale (e.g. a major scale), each scale degree (e.g. Tonic, Supertonic, Median, Subdominant, Dominant, Submedient, and Leading tone) and/or each musical mode (e.g. Ionian, Dorian, Phygian, Lydian, Mixolydian, Aeolian, and Locrian) are positioned in a similar position relative to one another. This allows for the scale degrees, musical modes, and other musical properties to be labeled on the stencil (e.g. stencil 400, first stencil 410a, second stencil 410b, or the like) and be correct in each of the plurality of positions, such as in each of the twelve positions representing a major scale. FIG. 4E shows an exemplary embodiment wherein first stencil 410a and second stencil 410b comprise labels 440 to represent the scale degree and musical modes for each musical note in the plurality of positions. More specifically, within each sub-stencil 420 there can be indicia representing the scale degree (e.g. I, II, III; Tonic, Supertonic, Media; or the like) and indicia representing the musical mode (e.g. Ionian, Dorian, Phrygian, or the like). In certain embodiments, alternative indicia may be used to represent the scale degree (e.g. Arabic numbers) and/or the musical modes (e.g. I for Ionian, D for Dorian, P for Phrygian, etc.). Furthermore, other indicia may be present, such as indicia representing any known minor, major, diminishing scales, or the like. In some embodiments, there may be either more indicia or less indicia than that shown in FIG 4E. For example, the stencil (e.g. stencil 400, first stencil 410a, second stencil 410b, or the like) may have indicia representing the scale degrees (but not the musical modes) or may have indicia representing the musical modes (but not the scale degrees).

As shown in FIGS. 1 and 3, base portion 110 may be a flat (i.e., planar) or relatively flat surface. Additionally, to accommodate the twelve unique positions to represent each major scale, a total of four marks 120 may be repeated on base portion 110 (e.g. additional marks 122 representing the musical notes of "G#", "B", "F#/G♭", and "D#" shown in FIG. 1 using dashed lines). The additional marks 122 can be used when placing a stencil (e.g. stencil 400, first stencil 410a, second stencil 410b, or the like) in a unique position to surround the seven marks 120 representing the musical notes in the major scales of "E" and "B". One of ordinary skill in the art would understand that the indicia for the plurality of marks 120 may be revised such that the musical scales are in a different order, and in such embodiments, the additional marks may represent different scales.

To avoid the use of additional marks 122 while still ensuring that the stencil can be positioned to surround any of the twelve major scales, base portion 110 can be provided in a three-dimensional configuration. For example, base portion 110 can be provided in the shape of a cylinder, a rectangular prism, or the like. FIGS. 6A-6E illustrate an exemplary music theory comprehension device 600 having a cylindrical shape. Similar to music theory comprehension device 100, music theory comprehension device 600 may comprise a base portion 610, one or more stencils 620, and a plurality of sub-stencils 630. Even though not shown, base portion 610 may comprise a plurality of marks, such as marks similar to marks 120, wherein each of the plurality of marks 120 represent a musical note. As discussed herein, the plurality of marks 120 on base portion 610 may comprise thirty-six marks which represent thirty-six musical notes and/or chords. In some embodiments, base portion 610 comprises exactly thirty-six marks to represent exactly thirty-six musical notes and/or chords.

In some embodiments, music theory comprehension device 600 may comprise a knob 605, top portion 607a, and bottom portion 607b. In such embodiments, knob 605 may be used to rotate one of the base portion 610 relative to the stencil 620 or may be used to rotate the stencil 620 relative to the base portion 610. Additionally, another knob (not shown) may be used to rotate the other of the base portion 610 or the stencil 620. In some embodiments, one or both of the base portion 610 and the stencil 620 may be attached to the top portion 607a and the bottom portion 607b.

In an exemplary embodiment, the base portion 610 is adjustable by knob 605 and the stencil 620 is attached to top portion 607a and bottom portion 607b. In such an embodiment, a user may adjust base portion 610 via knob 605 to selectively reposition base portion 610 relative to stencil 620.

In various embodiments, the systems and methods discussed herein may be embodied on a non-transitory computer-readable medium embedded in, or in communication with, a device that can process and carry out instructions according to the methods and systems discussed herein. In some embodiments, the two-dimensional and/or three-dimensional music theory comprehension device may be displayed on a graphical user interface, such as a digital screen (e.g. a phone screen, tablet screen, or computer screen) or projected via an electronic device (e.g., a projector) onto a surface (e.g., a wall, while board, etc.).

Figure 7A:
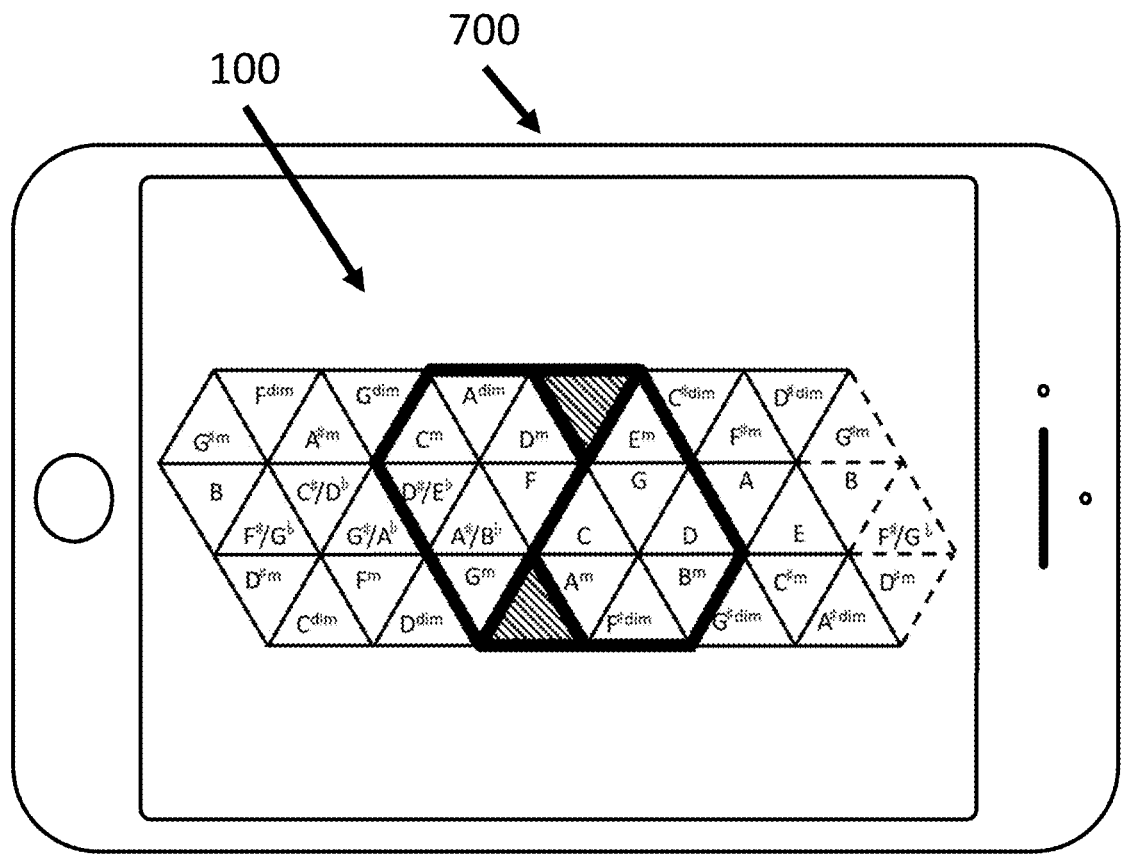
FIGS. 7A and 7B show an exemplary music theory comprehension device displayed on an electronic device.
Figure 7B:
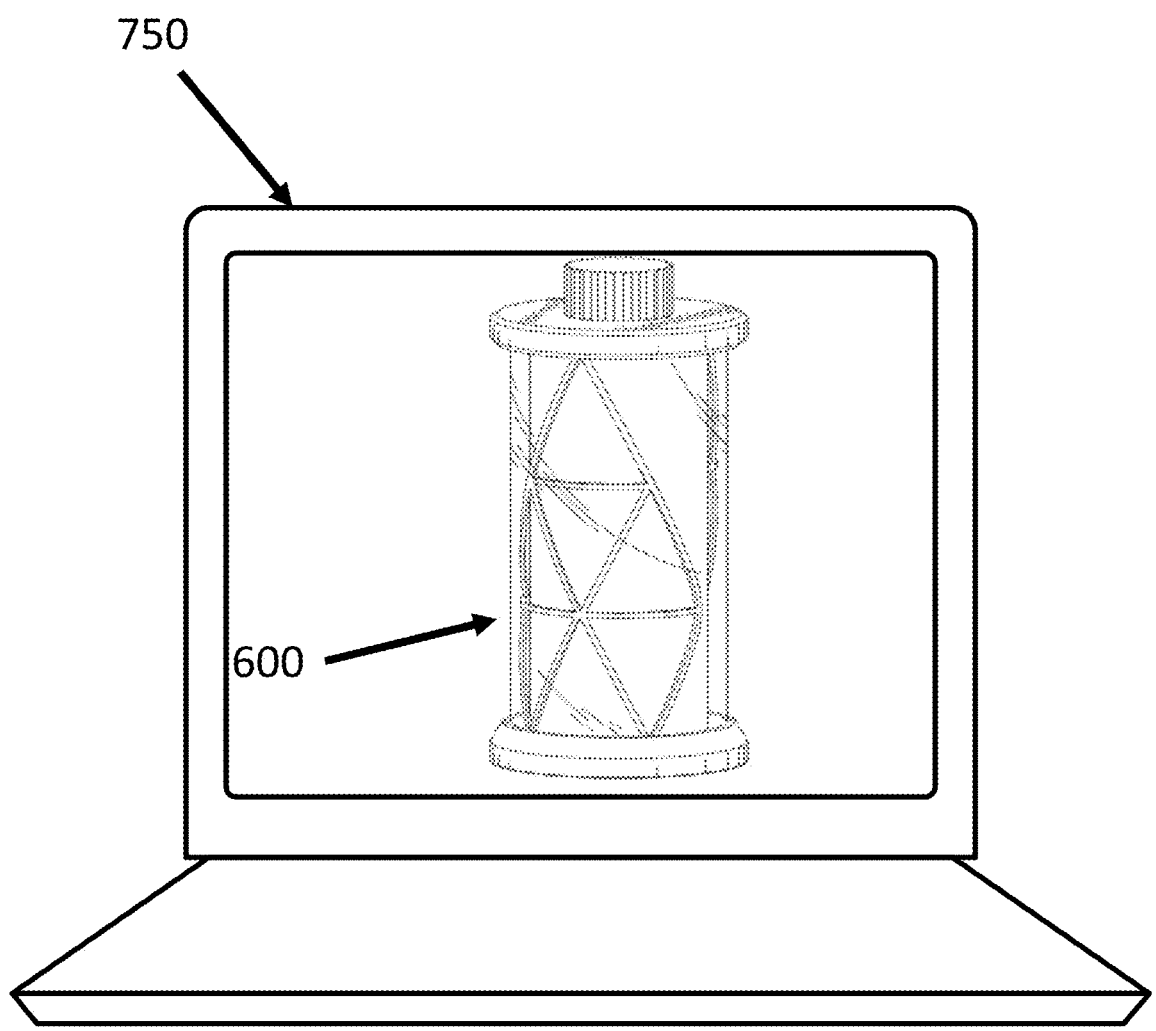

The systems and methods discussed herein may be embodied in one or more processors operating according to instructions included in a memory, such as a non-transitory computer readable medium. For example, the music theory comprehension devices of the present invention may be displayed on an electronic device, such as on a mobile device, an electronic tablet, a computer, or the like. FIG. 7A shows an exemplary embodiment wherein music theory comprehension device 100 is displayed on mobile device 700. In some examples, a user may be able to interact with music theory comprehension device 100 via mobile device 700, such as via a user interface (e.g. a touch screen display, mouse, keyboard, controller, joystick, gesture recognition, etc.). Similarly, FIG. 7B shows an exemplary embodiment wherein music theory comprehension device 600 is displayed on laptop 750. In some examples, a user may be able to interact with music theory comprehension device 600 via mobile device 700, laptop 750, or other electronic device, such as via a user interface (e.g. using a (ouch screen display, mouse, keyboard, controller, joystick, gesture recognition, etc.).

Various embodiments have been described herein. Such examples are non-limiting, and do not define or limit the scope of the invention in any way. Rather, these and other examples are within the scope of the following claims.

The invention claimed is:

1. A device for music theory comprehension comprising:
a base portion, wherein the base portion comprises a plurality of marks, each mark comprising indicia representing a musical note, wherein the base portion has a cylindrical shape and the marks are positioned so as to extend around a circumference of the base portion; and
a first stencil, the first stencil comprising a first interior shape, the first stencil and the base portion being selectively positionable relative to each other by rotating the first stencil relative to the base portion or by rotating the base portion relative to the first stencil;
wherein at each of a plurality of predetermined positions determined by the plurality of marks, the first interior shape of the first stencil surrounds multiple marks, the multiple marks comprising seven musical notes representing a unique chord family.

2. The device of claim 1, wherein each of the plurality of marks is surrounded by a border, and each border comprises a geometrical shape.

3. The device of claim 2, wherein the borders are configured to tesselate or otherwise fit together.

4. The device of claim 1, wherein each unique chord family is a unique major chord family.

5. The device of claim 4, wherein:
the plurality of predetermined positions comprises twelve positions, one for each unique major chord family; and
the plurality of marks consists of from thirty-six to forty marks.

6. The device of claim 4, wherein the first stencil further comprises seven sub-stencils, wherein at each of the plurality of predetermined positions each sub-stencil surrounds a single mark;
indicia marking a first grouping of sub-stencils as a major chord;
indicia marking a second grouping of sub-stencils as a minor chord; and
indicia marking a third grouping of sub-stencils as a diminished chord; wherein
at each of the plurality of predetermined positions representing a unique major chord family:
an interior shape of the first grouping of sub-stencils surrounds three musical notes representing a major chord for the unique major chord family;
an interior shape of the second of grouping sub-stencils surrounds three musical notes representing a minor chord for the unique major chord family; and
an interior shape of the third grouping of sub-stencils surrounds three musical notes representing a diminished chord for the unique major chord family.

7. The device of claim 6, wherein the first stencil further comprises:
a transparent layer, the transparent layer having indicia such that each sub-stencil contains indicia representing a musical mode; wherein
each sub-stencil represents a different musical mode; and
at each of the plurality of predetermined positions, the relative position of the marks and the first stencil indicate the seven musical modes of the unique major chord family; wherein
the indicia representing each musical mode comprises the respective scale-degree number of the musical mode.

8. The device of claim 4, wherein the base portion comprises:
a center row of marks with indicia representing the tonic of every unique major chord, wherein adjacent marks in the center row having indicia representing musical notes are spaced by a perfect fifth;
each mark in the center row is additionally adjacent to a mark with indicia representing a dominant note in the respective unique major key, wherein
each dominant note represents the relative minor chord in the respective unique major chord family, and
adjacent dominant notes are spaced by whole-step increments; and
each mark having indicia representing a respective leading note is opposite the mark with indicia representing the respective dominant note, wherein
each leading note represents a diminishing chord in the respective unique major chord family, and
adjacent leading notes are spaced by whole-step increments.

9. The device of claim 8, wherein the first stencil additionally surrounds major chords, minor chords and diminished chords for each of the plurality of predetermined positions.

10. The device of claim 8, wherein the indicia representing the respective dominant notes comprise a first hue, and the indicia representing the respective leading notes comprise a second hue that is different from the first hue.

11. The device of claim 1, wherein each mark surrounded by the first interior shape of the first stencil representing the seven musical notes in the unique musical key is adjacent to at least one other mark surrounded by the first interior shape of the first stencil representing seven musical notes in the unique musical key.

12. The device of claim 1, wherein only the marks representing the seven musical notes in the unique musical key are surrounded by the first interior shape of the first stencil.

13. The device of claim 1, wherein each mark within the first interior shape is visible to a user such that no marks within the first interior shape are hidden from view.

14. The device of claim 1, further comprising:
a second stencil, the second stencil comprising a second interior shape; and
the second stencil and the base portion being selectively positionable relative to each other, wherein:
at a plurality of second predetermined positions determined by the marks, the second interior shape of the second stencil surrounds multiple marks that represent seven musical notes in a unique musical key representing a unique chord family; and
the multiple marks surrounded by the second interior shape are different from the multiple marks surrounded by the first interior shape.

15. The device of claim 14, wherein the first stencil is fixedly attached to the second stencil.

16. The device of claim 14, further comprising two blocker regions, wherein the blocker regions are configured to hide from view the marks that are positioned below the blocker regions.

17. The device of claim 1, wherein:
the plurality of predetermined positions comprises twelve positions, each position being associated with a unique major scale and/or unique major chord family; and
the plurality of marks consists of thirty-six marks.

18. A method of manufacturing a music theory comprehension device, the method comprising:
- providing a base portion;
- marking the base portion with a plurality of marks, each mark comprising indicia representing a musical note;
- providing a first stencil having a first interior shape, the first stencil and the base portion being positioned relative to each other such that at a plurality of predetermined positions determined by the plurality of marks, the first interior shape of the first stencil surrounds multiple marks, the multiple marks comprising seven musical notes representing a unique chord family, wherein each mark within the first interior shape is visible to a user such that no marks within the first interior shape are hidden from view.

19. A device for music theory comprehension comprising:
- a base portion, wherein the base portion comprises a plurality of marks, each mark comprising indicia representing a musical note; and
- a first stencil, the first stencil comprising a first interior shape, wherein the first stencil and the base portion are selectively positionable relative to each other;
- wherein at each of a plurality of predetermined positions determined by the plurality of marks, the first interior shape of the first stencil surrounds multiple marks, the multiple marks comprising seven musical notes representing a unique chord family, wherein each mark within the first interior shape is visible to a user such that no marks within the first interior shape are hidden from view.

20. The device of claim 19, wherein the first stencil comprises a transparent or semi-transparent material.

* * * * *